(12) United States Patent
Kim et al.

(10) Patent No.: US 7,789,454 B2
(45) Date of Patent: Sep. 7, 2010

(54) FRAME STRUCTURE FOR VERTICALLY MOUNTING INTEGRATED PACKAGE

(75) Inventors: Dal Kim, Gyeonggi-do (KR); Hae Kyu Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 111 days.

(21) Appl. No.: 12/006,193

(22) Filed: Dec. 31, 2007

(65) Prior Publication Data

US 2009/0121510 A1    May 14, 2009

(30) Foreign Application Priority Data

Nov. 13, 2007    (KR)    ........................ 10-2007-0115231

(51) Int. Cl.
*B62D 21/00*    (2006.01)
(52) U.S. Cl. .............. 296/184.1; 296/24.3; 296/203.04; 296/193.02
(58) Field of Classification Search ............ 296/193.07, 296/187.08, 193.08, 187.11, 193.04, 24.3, 296/193.02, 203.4, 184.1
See application file for complete search history.

(56) References Cited

U.S. PATENT DOCUMENTS

| 4,428,599 | A | * | 1/1984 | Jahnle | 280/784 |
| 5,641,031 | A | * | 6/1997 | Riemer et al. | 429/13 |
| 6,073,991 | A | * | 6/2000 | Naert | 296/187.02 |
| 6,260,645 | B1 | | 7/2001 | Pawlowski et al. | |
| 6,866,316 | B1 | * | 3/2005 | Harder et al. | 296/26.09 |
| 6,932,405 | B2 | * | 8/2005 | Nakagawa et al. | 296/29 |
| 7,338,115 | B2 | * | 3/2008 | Rocheblave et al. | 296/193.07 |
| 7,422,271 | B2 | * | 9/2008 | Wolkersdorfer et al. | 296/193.02 |
| 7,513,329 | B2 | * | 4/2009 | Nakashima et al. | 180/312 |
| 2005/0057075 | A1 | * | 3/2005 | Edwards | 296/184.1 |
| 2006/0103170 | A1 | * | 5/2006 | Ikemoto et al. | 296/203.04 |
| 2006/0197351 | A1 | * | 9/2006 | Bastian et al. | 296/26.09 |

FOREIGN PATENT DOCUMENTS

| JP | 07-108956 | | 4/1995 |
| JP | 11-208287 | | 8/1999 |
| JP | 2000-351328 | | 12/2000 |
| JP | 2007-015600 | | 1/2007 |
| JP | 2007015600 | A * | 1/2007 |

* cited by examiner

*Primary Examiner*—Patricia L Engle
*Assistant Examiner*—SunSurraye Westbrook
(74) *Attorney, Agent, or Firm*—Edwards Angell Palmer & Dodge LLP; Peter F. Corless

(57) ABSTRACT

The present invention relates to a frame structure for vertically mounting an integrated package, which can improve mountability of the batteries and structural rigidity of the integrated package and a vehicle body. To this end, the present invention provides a frame structure which comprises: a rear floor frame disposed behind a rear seat of the vehicle in a transverse direction of body of the vehicle; and a pair of guide frames are installed in parallel with each other behind the rear floor frame in a longitudinal direction of the vehicle body.

7 Claims, 5 Drawing Sheets

FRAME STRUCTURE FOR VERTICALLY MOUNTING INTEGRATED PACKAGE

CROSS-REFERENCE TO RELATED APPLICATION

This application claims the benefit under 35 U.S.C. §119(a) of Korean Patent Application No. 10-2007-0115231 filed on Nov. 13, 2007, the entire contents of which are incorporated herein by reference.

BACKGROUND (a) Technical Field

The present invention relates to a frame structure for vertically mounting an integrated package to a rear floor panel of a vehicle, which can improve mountability of the batteries and structural rigidity of the integrated package and body of the vehicle.

(b) Background Art

In order to increase the fuel consumption ratio and purify the exhaust gas, there has been pursued the development of vehicles including a novel driving mechanism such as electric vehicles, hybrid vehicles, etc. Such vehicles require mounting of an electrical equipment that is not provided to vehicles having an internal combustion engine.

Examples of the electrical equipment include a traction motor for electric vehicles or hybrid vehicles, a secondary battery for supplying power to a starter to re-start an engine along with an idle stop system for stopping the engine under an idling condition, etc. The mounting position of such electrical equipment must be determined in consideration of effective utilization of the compartment space and trunk space of a vehicle, stability security during the collision accident and the like.

As a prior art structure for mounting the electrical equipment, Japanese Patent Laid-Open Publication No. Hei 2003-165398 discloses a vibration isolation structure of a metallic electrical equipment case, which comprises a connection member for connecting the external wall of an electrical equipment case at the rear of a cabin to a lateral member of a vehicle body.

Also, Japanese Patent Laid-Open Publication No. Hei 2004-161054 discloses a structure for attaching an electrical storage device to a vehicle body, in which the electric storage device holds upper and lower portions of a support plate for supporting an electric storage device body with a pair of mounting brackets, respectively, attaches a pair of mounting brackets on the upper side to an upper side cross member while attaching a pair of mounting brackets on the lower side to a lower side cross member, and connects upper and lower mounting brackets on the side opposite to the electric storage device body of the support plate via a unit box.

Further, Japanese Patent No. 3660296 discloses an arrangement structure for battery devices, in which behind a rear seat, a rear pillar cross member is provided in the vehicle width direction, in which respective ends of the rear pillar cross member are connected with an inner panel of a wheel house through a bracket and a reinforcing plate, in which a capacitor is enclosed with a case and a cover, the upper end part of the capacitor is fixed to the rear pillar cross member, and the lower end part of the capacitor is connected to a floor cross member which is provided in the vehicle width direction on the upper surface of a rear floor, wherein the capacitor is arranged at an upper portion on the rear surface of the rear seat under a slightly backwardly inclined standing state.

In addition, Japanese Patent No. 3571704 discloses an on-vehicle structure of high voltage electrical box, which is installed backwardly inclinedly at the rear of a seat back, and in which a frame member is installed at right and left bottoms of the high voltage electrical box, respectively, and is extended backwardly from a front portion of the high voltage electrical box, wherein frame member is connected to a side frame constituting a part of the structural member of the vehicle and each frame member has an "L" shape in cross-section while being connected to a front end and a rear end of the high voltage electrical box.

However, the above prior art structures encounter a shortcoming in that they require additional mounting of a frame member for connection of the vehicle body in a case, but these inclined mounting structures require an additional installation of a separate member for the stable mounting thereof to the vehicle.

This causes an increase in weight and requires an additional installation of a connecting frame member, so that provision for assembly of bolts and nuts is added at the time of the in-line work, and change of a vehicle body may be increasingly induced to thereby increase the development cost and mold cost.

The information disclosed in this Background section is only for enhancement of understanding of the background of the invention and should not be taken as an acknowledgment or any form of suggestion that this information forms the prior art that is already known to a person skilled in that art.

SUMMARY OF THE DISCLOSURE

The present invention has been made in an effort to solve the above problems occurring in the prior art, and it is an object of the present invention to provide a frame structure for vertically mounting an integrated package on a rear floor panel of a vehicle, which can vertically mount an integrated package on a rear floor frame of the vehicle body even without having an additional connecting bracket member installed on the integrated package while ensuring structural rigidity of the integrated package and the rear floor, and can reduce the number of in-line work processes thereby solving a problem related to the insertion of the integrated package into a hybrid vehicle, i.e., the most critical issue on an follow-up in-line.

Another object of the present invention is to provide a frame structure for vertically mounting an integrated package on a rear floor panel, in which only guide frames can be additionally mounted on a rear floor of a vehicle body by means of spot-welding without any modification of the rear floor of an existing vehicle to thereby prevent the dual system of a mold development cost, in which the guide frames can serve as both guiders and stoppers to thereby address and solve a problem of quality degradation due to collision between a vehicle body's package tray and an integrated package casing upon the insertion of the integrated package into a vehicle, and in which when the integrated package is inserted into the vehicle, it can be stably held in position so as to be accurately seated on a mounting location.

In order to accomplish the above object, in one aspect, the present invention provides a frame structure for vertically mounting an integrated package on a rear floor panel of a vehicle, the frame structure comprising: a rear floor frame disposed behind a rear seat of the vehicle in a transverse direction of body of the vehicle; and a pair of guide frames are installed in parallel with each other behind the rear floor frame in a longitudinal direction of the vehicle body.

In a preferred embodiment, a lower frame is attached on an under side of the integrated package such that the lower frame moves along the guide frames.

In another preferred embodiment, each of the guide frames has a U-shaped cross-section and the front end thereof is securely fixed to the rear floor frame by means of spot welding.

In yet another preferred embodiment, the lower frame includes a pair of guide groove sections each of which has a cross-sectional shape corresponding to the U shape of the guide frames so that the guide groove sections can slidably move along the guide frames.

In still another preferred embodiment, the rear floor frame is provided with fixing protrusions protruding upwardly at or near the positions where the front ends of the guide frames are fixed to the rear floor frame, thereby allowing the integrated package to be accurately seated at a predetermined position of the lower frame.

In yet a still another preferred embodiment, each of the guide groove sections of the lower frame is provided with a protrusion-accommodating slit formed at the front end thereof. When the front ends of the guide groove sections of the lower frame move slidably along the guide frames, the fixing protrusions can be inserted into the protrusion-accommodating slits to stop the movement of the front ends of the guide groove sections at the predetermined position of the lower frame.

In a further preferred embodiment, the rear ends of the guide groove sections and the rear ends of the guide frames have sloping faces. When the front ends of the guide groove sections move slidably along the guide frames, the sloping faces of the rear ends of the guide groove sections come into contact with those of the rear ends of the guide frames to stop the movement of the front ends of the guide groove sections at the predetermined position of the lower frame.

In a still further preferred embodiment, the rear floor frame may further comprise an auxiliary guide frame protruding upwardly in the middle thereof so as to guide an intermediate portion of the lower frame. Suitably, the auxiliary guide frame may comprise therein an auxiliary fixing protrusion protruding upwardly.

In yet a still further preferred embodiment, the lower frame may further comprise an auxiliary guide groove section formed in the middle thereof so as to correspond to the auxiliary guide frame. Preferably, the front end of the auxiliary guide groove section is provided with an auxiliary protrusion-accommodating slit, which is formed at a position corresponding to the position of the auxiliary fixing protrusion.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like. The present frame structure will be particularly useful with a wide variety of motor vehicles.

Other aspects of the invention are discussed infra.

Figure 1:
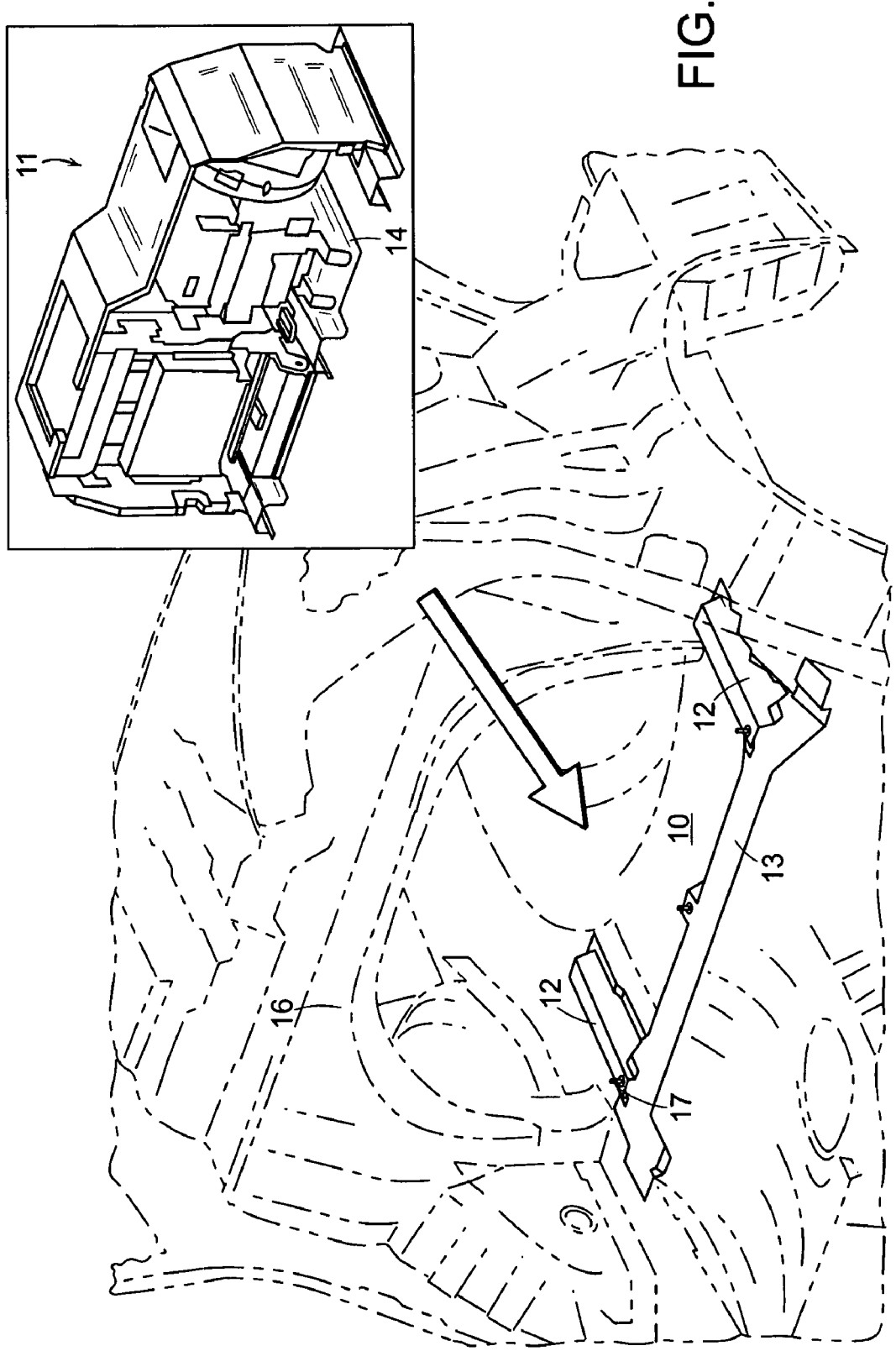
FIG. 1 is a pictorial perspective view showing a frame structure for vertically mounting an integrated package according to a preferred embodiment of the present invention before the integrated package is inserted into a vehicle.
Figure 2:
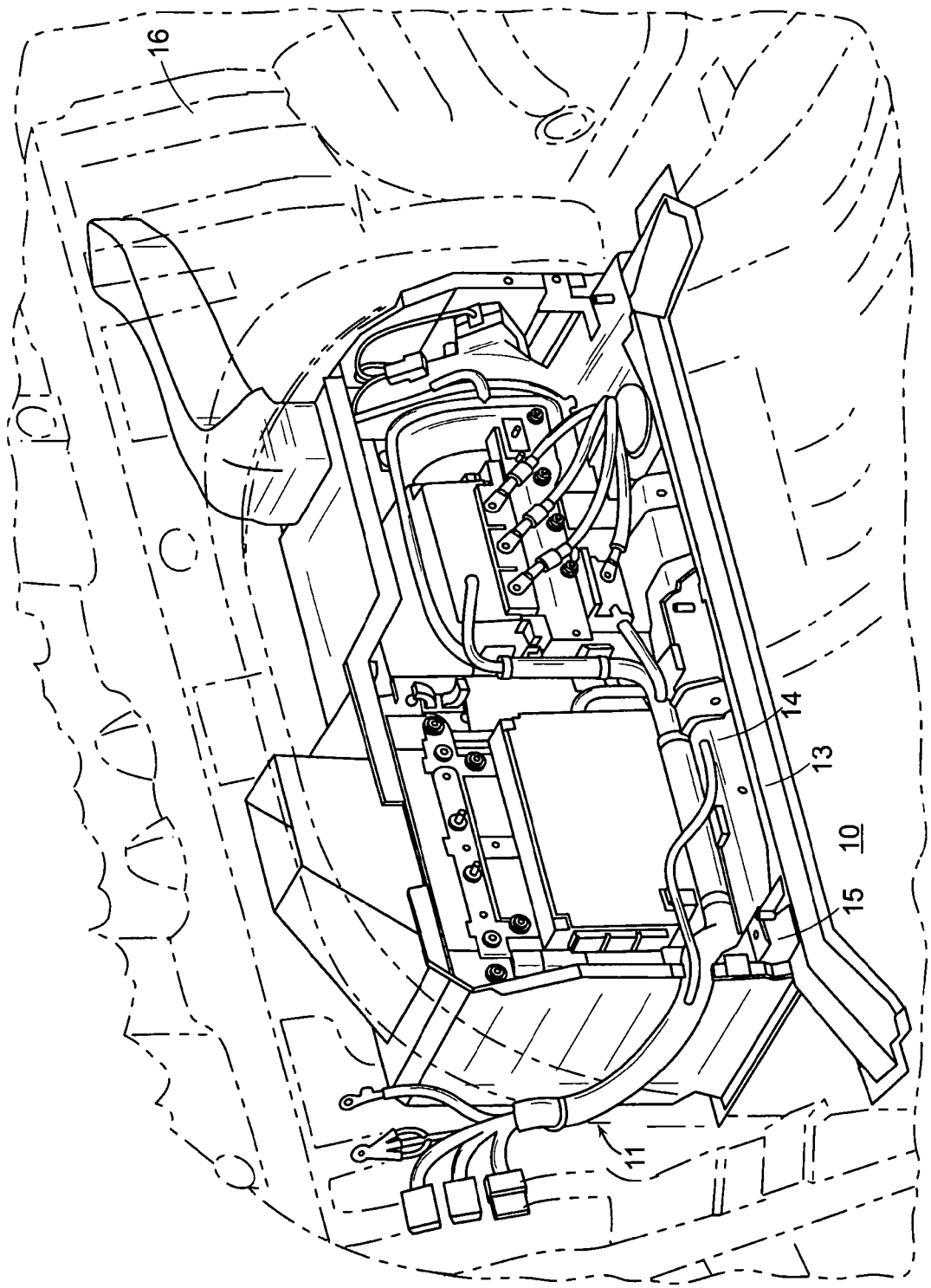
FIG. 2 is a pictorial perspective view showing a frame structure for vertically mounting an integrated package according to a preferred embodiment of the present invention after the integrated package is inserted into a vehicle.
Figure 3:
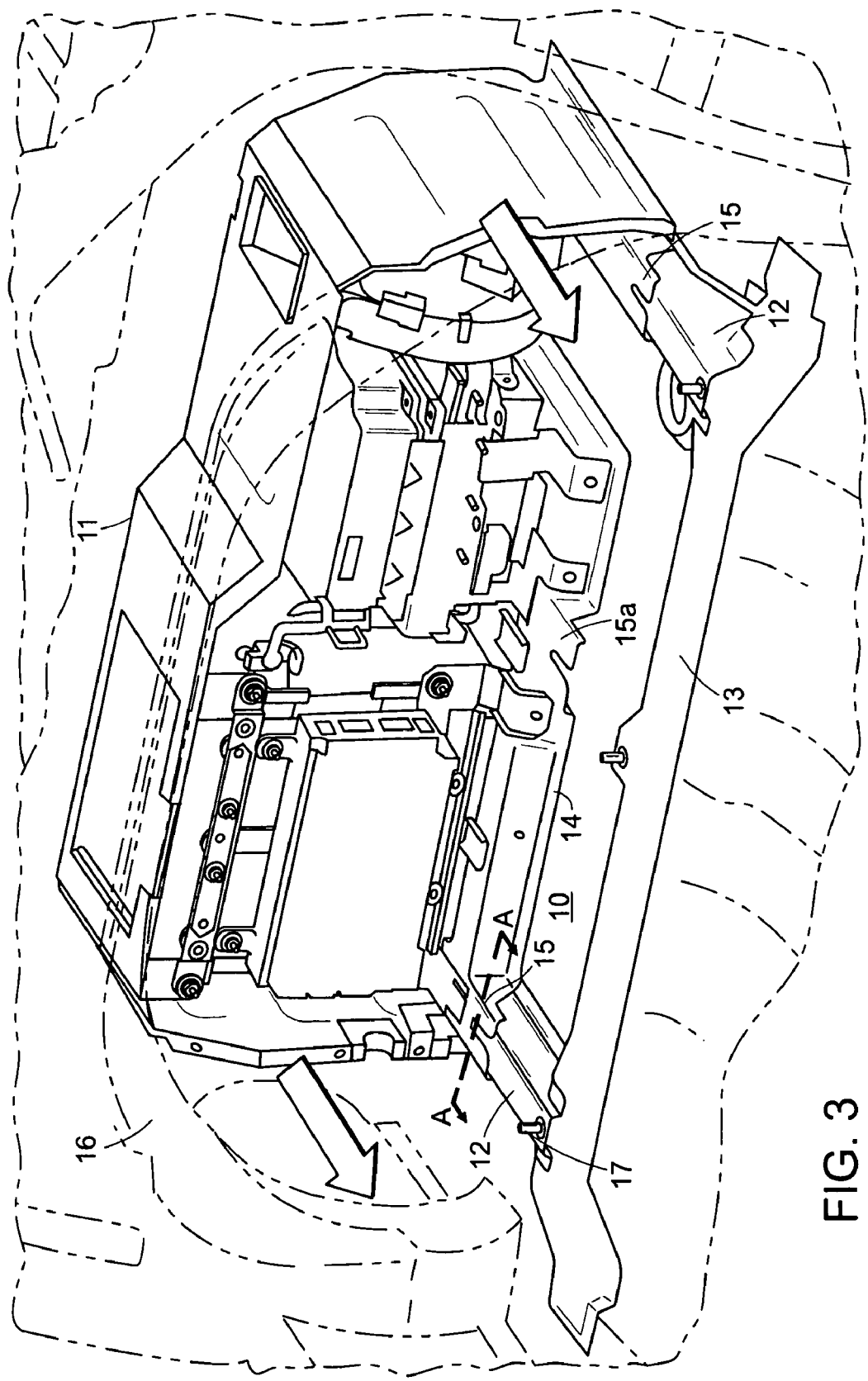
FIG. 3 is a pictorial perspective view showing a frame structure for vertically mounting an integrated package according to a preferred embodiment of the present invention in a state where guide frames and a lower frame of the integrated package forms a U shape after the integrated package is inserted into a vehicle.
Figure 4:
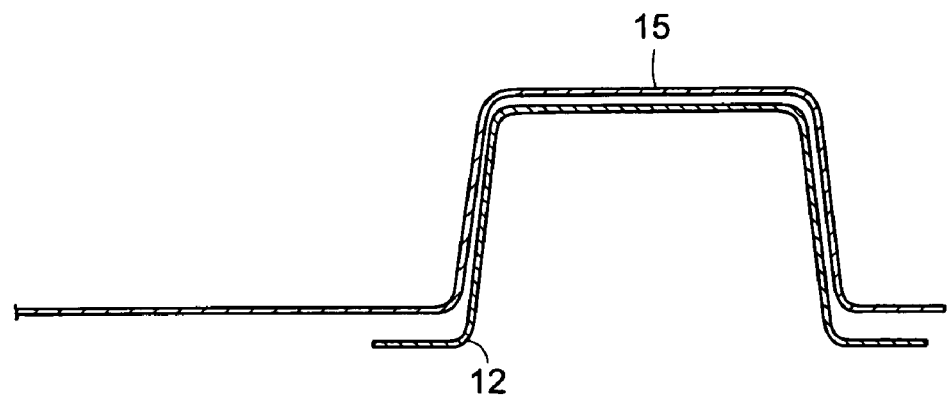
FIG. 4 is a cross-sectional view taken along the line A-A' of FIG. 3.
Figure 5:
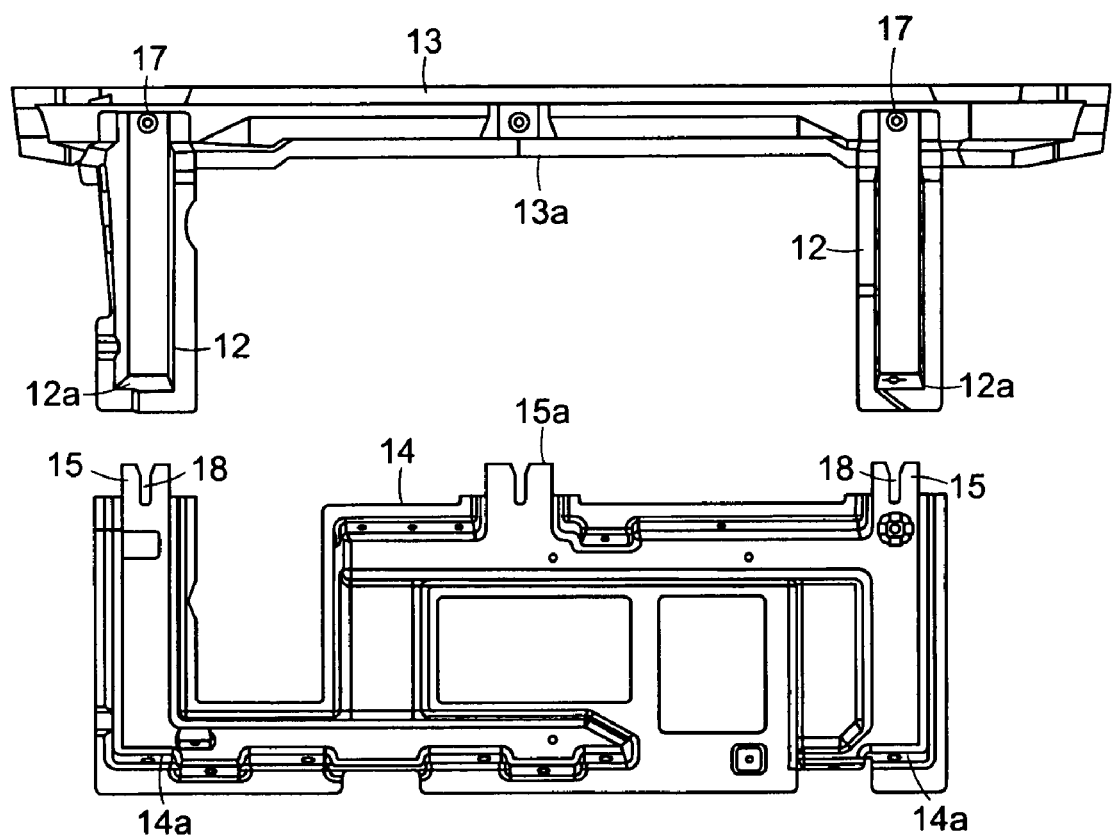
FIG. 5 is a top plan view showing a state where the guide frames and the lower frame of the integrated package are disassembled from each other according to a preferred embodiment of the present invention.
Figure 6:
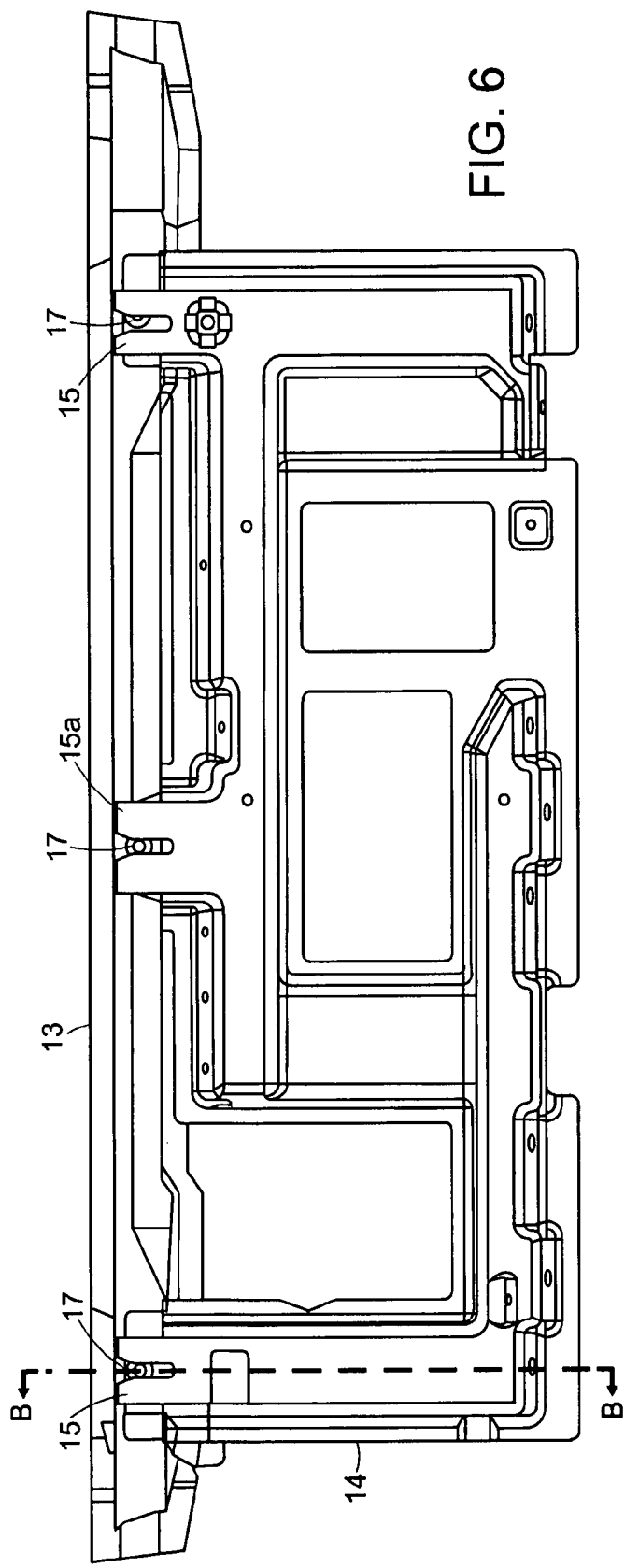
FIG. 6 is a top plan view showing a state where the lower frame of the integrated package is mounted on the top of the guide frames of FIG. 5 according to a preferred embodiment of the present invention.
Figure 7:
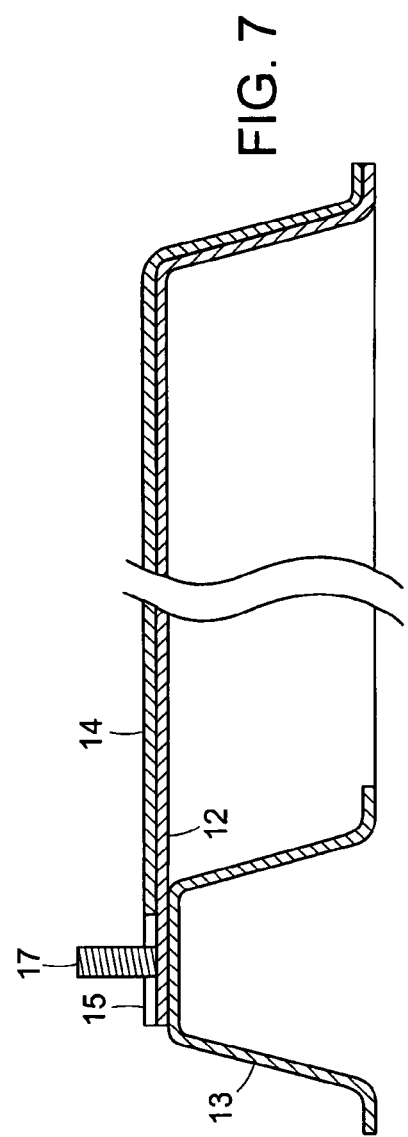
FIG. 7 is a cross-sectional view taken along the line B-B' of FIG. 6.

Reference numerals set forth in the Drawings includes reference to the following elements as further discussed below:

10: rear floor panel
11: integrated package
12: guide frames
13: rear floor frame
13a: auxiliary guide frame
14: lower frame
12a, 14a: sloping face
15: guide groove section
15a: auxiliary guide groove section
16: package tray
17: fixing protrusion
18: protrusion-accommodating slit

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

FIGS. 1 to 7 are views showing a frame structure for vertically mounting an integrated package a preferred embodiment of the present invention.

As shown in FIG. 1, a pair of opposed guide frames 12 are independently securely installed at both sides of a rear floor frame 13 to cause an integrated package 11 to be vertically mounted at a rear floor panel 10 positioned in the rear of a rear seat of a vehicle.

The rear floor frame 13 is installed in a transverse direction of a vehicle body in the rear of the rear seat, and the guide frames 12 are installed in parallel with each other in the rear of the rear floor frame 13 in a longitudinal direction of the vehicle body.

The guide frames 12 are installed on the rear floor panel 10 so as to allow the integrated package 11 to be inserted into the vehicle using a lower frame of the integrated package toward the rear of the trunk on an in-line. At this time, the lower frame 14 is attached on the underside of the integrated package 11 before the integrated package 11 is inserted into the vehicle.

Each of the guide frames 12 according to a preferred embodiment of the present invention has a U shape in cross-section and formed extendedly in a longitudinal direction of the vehicle body so as to allow the lower frame 14 of the integrated package 11 to be slidably moved therealong. The lower frame 14 is formed concavely with a pair of opposed guide groove sections 15 whose shape in cross-section corresponds to the U shape of the guide frames 12 in such a fashion that the pair of opposed guide groove sections are arranged in parallel with each other in a longitudinal direction of the vehicle body.

Also, the rear floor frame 13 has an auxiliary guide frame 13a protrudingly formed in the middle thereof so as to guide an intermediate portion of the lower frame 12, and the lower frame 12 may have an auxiliary guide groove section 15a formed in the middle thereof so as to correspond to the auxiliary guide frame 13a.

Preferably, the auxiliary guide frame is provided with an auxiliary fixing protrusion protruding upwardly. Also preferably, the front end of the auxiliary guide groove section is provided with an auxiliary protrusion-accommodating slit formed at a position corresponding to the position of the auxiliary fixing protrusion.

The guide frames 12 are securely fixed to the rear floor frame 13 by means of spot welding, and has a U-shaped cross-sectional structure so that the lower frame 14 of the integrated package 11 can be accurately seated at the predetermined mounting position thereof while moving stably slidably along the guide frames 12.

Further, by virtue of such a stable guide structure, when the integrated package 11 is inserted into the vehicle toward the rear of the trunk, there is eliminated a risk of collision between a package tray 16 of the vehicle body and a casing of the integrated package 11.

In the meantime, in case where the integrated package 11 is inserted into the vehicle from the rear of the trunk, a worker's field of view is interrupted by the casing of the integrated package 11, which makes it impossible to accurately grasp the mounting position of the integrated package 11.

In order to solve the above problem, in a preferred embodiment of the present invention, fixing protrusions 17 are formed upwardly at the front ends of the opposed guide frames 12 so that the lower frame 14 of the integrated package 11 can be stopped at the predetermined mounting position by virtue of the fixing protrusions 17. In this case, the fixing protrusions 17 may be formed on the guide frames 12 in such a fashion as to be securely fixed to the guide frames 12 by means of stud bolts.

Each of the opposed guide groove sections 15 of the lower frame 14 has a protrusion-accommodating slit 18 having a generally "V" shape formed at a front end thereof so that the fixing protrusions 17 can be completely inserted into the protrusion-accommodating slits 18 to cause the movement of the front ends of the guide groove sections 15 to be stopped.

Moreover, each of the guide frames 12 has a sloping face 12a formed at the rear end thereof, and each of the guide groove sections, which longitudinally slide along the top of the guide frame 12, also has a sloping face 14a formed at the rear end thereof to correspond to the sloping face 12a, so that the contact surface of the integrated package 11 can be accurately secured by virtue of the sloping face-contact of the guide frame 12 and the guide groove section 15.

Thus, such separate guide frames 12 are additionally installed on the rear floor of the vehicle body, and the lower frame 14 of the integrated package 11 is installed in such a fashion as to move slidably along the top of the guide frames 12, so that when the integrated package 11 is inserted into the vehicle toward the rear of the trunk after having been mounted on the lower frame 14 on the in-line, it is possible to address and solve a problem of the quality degradation due to the collision between the package tray 16 of the vehicle body and the integrated package 11.

Besides, the lower frame 14 of the integrated package 11 is vertically mounted on the guide frames 12 even without having an additional connecting bracket member installed on the integrated package to thereby ensure the structural rigidity of the rear floor of the vehicle body.

Particularly, by virtue of the fixing protrusions 17 formed at the front ends of the guide frames 12 and security of the contact surface of the lower frame by the sloping faces formed at the rear ends of both the guide groove sections 15 of the lower frame 14 and the guide frames 12, when the integrated package 11 is inserted into the vehicle toward the rear of the trunk, the mounting position of the lower frame 14 can be secured accurately.

As described above, according to a frame structure for vertically mounting an integrated package of the present invention, separate guide frames for the vertical mounting of the integrated package are spot-welded to the rear floor panel of the vehicle body in the rear of the rear seat, so that the guide frames can serve as guiders upon the mounting of a jig (the lower frame of the integrated package) on the in-line to thereby address and solve a problem of quality degradation due to collision between the vehicle body's package tray and the integrated package casing upon the insertion of the integrated package into the vehicle toward the rear of the trunk after having been mounted on the jig.

In addition, the lower frame of the integrated package is installed slidably on the guide frames so that the structural rigidity of the integrated package and the sides of the vehicle can be ensured and stability can be secured upon collision of the sides of a hybrid vehicle.

Furthermore, the guide frames function as stoppers using the fixing protrusions (stud bolts) formed at the front ends of the guide frames and the sloping faces formed at the rear ends of the guide frames so that when the integrated package is inserted into the vehicle, it can be accurately seated at the mounting position of the lower frame thereof.

The invention has been described in detain with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A frame structure for vertically mounting an integrated package on a rear floor panel of a vehicle, the frame structure comprising:

a rear floor frame disposed behind a rear seat of the vehicle in a transverse direction of body of the vehicle; and a pair of guide frames are installed in parallel with each other behind the rear floor frame in a longitudinal direction of the vehicle body, the guide frames being mechanically connected to the rear floor frame in a perpendicular orientation; and a lower frame attached on an under side of the integrated package, wherein the lower frame is slidably engaged with the guide frames to be able to move along the guide frames, wherein each of the guide frames has a U-shaped cross-section and the front end thereof is securely fixed to the rear floor frame by means of spot welding, the lower frame includes a pair of guide groove sections each of which has a cross-sectional shape corresponding to the U-shape of the guide frames so that the guide groove sections can slidably move along the guide frames, the rear floor frame is provided with fixing protrusions protruding upwardly at or near the positions where the front ends of the guide frames are fixed to the rear floor frame, thereby allowing the integrated package to be accurately seated at a predetermined position of the lower frame, and each of the guide groove sections of the lower frame is provided with a protrusion-accommodating slit formed at the front end thereof so that when the front ends of the guide groove sections of the lower frame move slidably along the guide frames, the fixing protrusions can be inserted into the protrusion-accommodating slits to stop the movement of the front ends of the guide groove sections at the predetermined position of the lower frame.

2. The frame structure of claim 1, wherein the rear ends of the guide groove sections and the rear ends of the guide frames have sloping faces, such that when the front ends of the guide groove sections move slidably along the guide frames, the sloping faces of the rear ends of the guide groove sections come into contact with those of the rear ends of the guide frames to stop the movement of the front ends of the guide groove sections at the predetermined position of the lower frame.

3. The frame structure of claim 1, wherein the rear floor frame further comprises an auxiliary guide frame protruding upwardly in the middle thereof so as to guide an intermediate portion of the lower frame.

4. The frame structure of claim 3, wherein the auxiliary guide frame comprises therein an auxiliary fixing protrusion protruding upwardly.

5. The frame structure of claim 4, wherein the lower frame further comprises an auxiliary guide groove section formed in the middle thereof so as to correspond to the auxiliary guide frame.

6. The frame structure of claim 5, wherein the auxiliary guide groove section is provided with an auxiliary protrusion-accommodating slit formed at a position corresponding to the position of the auxiliary fixing protrusion.

7. A frame structure for vertically mounting an integrated package on a rear floor panel of a vehicle, the frame structure comprising:

a rear floor frame disposed behind a rear seat of the vehicle in a transverse direction of body of the vehicle;

a pair of guide frames installed in parallel with each other behind the rear floor frame in a longitudinal direction of the vehicle body; and a lower frame attached on an under side of the integrated package such that the lower frame moves along the guide frames, wherein each of the guide frames has a U-shaped cross-section and the front end thereof is securely fixed to the rear floor frame by means of spot welding, the lower frame includes a pair of guide groove sections each of which has a cross-sectional shape corresponding to the U-shape of the guide frames so that the guide groove sections can slidably move along the guide frames, the rear floor frame is provided with fixing protrusions protruding upwardly at or near the positions where the front ends of the guide frames are fixed to the rear floor frame, thereby allowing the integrated package to be accurately seated at a predetermined position of the lower frame, and each of the guide groove sections of the lower frame is provided with a protrusion-accommodating slit formed at the front end thereof so that when the front ends of the guide groove sections of the lower frame move slidably along the guide frames, the fixing protrusions can be inserted into the protrusion-accommodating slits to stop the movement of the front ends of the guide groove sections at the predetermined position of the lower frame.

* * * * *